(12) United States Patent
Best et al.

(10) Patent No.: US 8,217,540 B2
(45) Date of Patent: Jul. 10, 2012

(54) ELECTRIC MOTOR WITH COOLING VENTILATOR EFFECT

(75) Inventors: Dieter Best, Ingelfingen (DE); Matthias Maschke, Kupferzell (DE); Erik Reichert, Boxberg (DE); Martin Kurz, Wüstenrot (DE)

(73) Assignee: EBM-PAPST Mulfingen GmbH & Co. KG, Mulfingen (DE)

( * ) Notice: Subject to any disclaimer, the term of this patent is extended or adjusted under 35 U.S.C. 154(b) by 214 days.

(21) Appl. No.: 12/694,868

(22) Filed: Jan. 27, 2010

(65) Prior Publication Data
US 2010/0187919 A1   Jul. 29, 2010

(30) Foreign Application Priority Data
Jan. 27, 2009   (DE) .................. 20 2009 001 033 U

(51) Int. Cl.
*H02K 9/06* (2006.01)
(52) U.S. Cl. ............................ 310/43; 310/64
(58) Field of Classification Search .................. 310/43, 310/61–64
See application file for complete search history.

(56) References Cited

U.S. PATENT DOCUMENTS

| | | | | |
|---|---|---|---|---|
| 4,682,065 A * | 7/1987 | English et al. | ................. | 310/90 |
| 6,059,541 A * | 5/2000 | Beckey et al. | ................. | 417/295 |
| 7,042,121 B2 * | 5/2006 | De Filippis et al. | ............ | 310/63 |
| 7,166,940 B2 * | 1/2007 | Ewert et al. | ...................... | 310/51 |
| 2005/0116554 A1 * | 6/2005 | Dano et al. | ....................... | 310/58 |
| 2005/0127775 A1 * | 6/2005 | Lee et al. | ......................... | 310/216 |
| 2006/0012254 A1 * | 1/2006 | Einheuser et al. | .............. | 310/58 |
| 2006/0022529 A1 * | 2/2006 | De Filippis et al. | ............ | 310/58 |
| 2007/0132323 A1 * | 6/2007 | Park | ............................ | 310/67 R |
| 2007/0164621 A1 * | 7/2007 | Kano et al. | ....................... | 310/71 |
| 2009/0284087 A1 * | 11/2009 | Takahashi et al. | .............. | 310/62 |

FOREIGN PATENT DOCUMENTS

| | | |
|---|---|---|
| DE | 39 17 040 A1 | 12/1989 |
| DE | 42 34 017 A1 | 4/1993 |
| EP | 0 488 961 A1 | 6/1992 |
| EP | 0 921 318 A2 | 6/1999 |

OTHER PUBLICATIONS

EP 10 15 0670—Search Report—Nov. 4, 2010.

* cited by examiner

*Primary Examiner* — Quyen Leung
*Assistant Examiner* — Naishadh Desai
(74) *Attorney, Agent, or Firm* — Brinks Hofer Gilson & Lione

(57) ABSTRACT

The invention relates to an electric motor with a stator and an external rotor, comprised of a rotor bell and a rotor cover that acts as a fan wheel. The rotor bell has several apertures in its bell floor. The rotor cover has several exhaust ports. The rotor cover is shaped like a plate and consists of a plate base and an annular wall. The exhaust ports are preferably evenly distributed in the annular wall. The inside of the plate base of the rotor cover that faces the rotor bell has several radially extending interior blades that are fixedly connected to it.

8 Claims, 3 Drawing Sheets

ELECTRIC MOTOR WITH COOLING VENTILATOR EFFECT

CROSS REFERENCE TO RELATED APPLICATIONS

Figure 1:
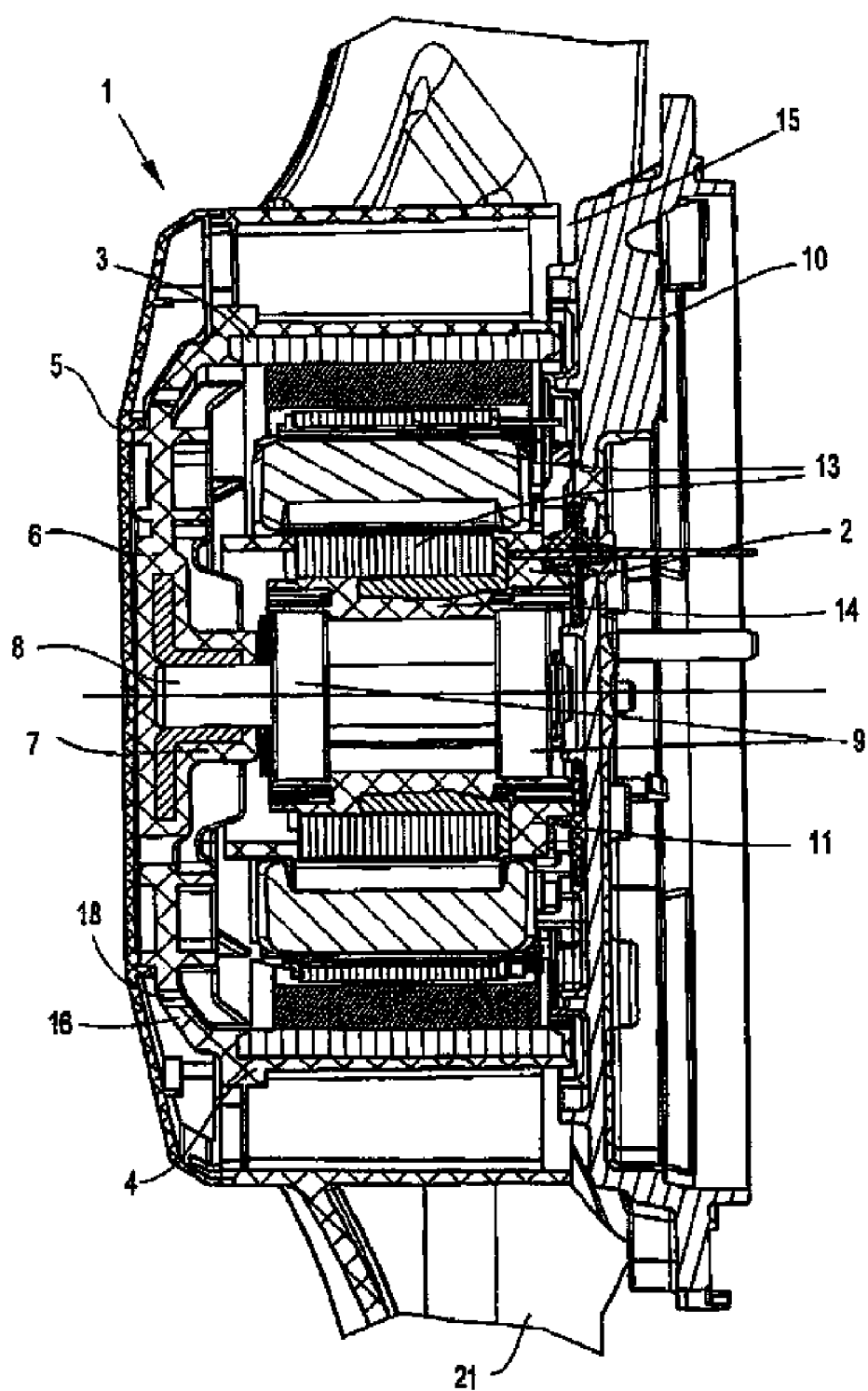

This application claims the benefit of priority to DE 20 2009 001 033.3 filed Jan. 27, 2009, the entire contents of which are each hereby incorporated herein by reference.

FIELD OF INVENTION

The invention relates to an electric motor with a stator and an external motor comprised of a rotor bell and rotor cover that acts as a fan wheel, whereby the rotor bell has several apertures in its bell floor, and the rotor cover has several exhaust ports.

Such electric motors are used particularly to drive a fan wheel inside a ventilation unit, wherein the components of the electric motor heat up during operation and in that way wear out more quickly. Moreover, the efficiency of the electric motor is reduced due to the heating.

An electric motor of the type cited above is described in DE 42 34 017 A1, whereby a main fan wheel that is affixed to the rotor bell of the electric motor, which is configured as an axial or radial fan wheel, produces a low pressure in the intake region in the proximity of the bell floor of the rotor bell. Due to the low pressure, the air in the interior of the electric motor is sucked through the apertures made in the bell floor, whereby new air flows into the motor through the gap between the rotor bell and the stator flange and/or through the throughflow openings made in the rotor bell. This brings about cooling of the electric motor. The rotor cover on the exterior of the bell floor serves as an auxiliary fan wheel, with exhaust ports, and intensifies the flow of air through the electric motor. The cooling of the electric motor has essentially positive effects on the lifetime and performance of the electric motor. A disadvantage of the apertures in the bell floor, as well as the exhaust ports of the auxiliary fan wheel, is that foreign particles such as dirt, dust, or moisture can penetrate the motor, and can under some circumstances have a negative effect on the cooling effect or even damage the components of the electric motor.

The invention is based on the objective of additionally improving the cooling of the electric motor by increasing the flow of air through the interior of the electric motor, and at the same time, make penetration by foreign particles, such as dirt, dust, or moisture more difficult.

This objective is accomplished with the means seen in Claim 1, and the dependent claims further develop the invention. In part, these measures have independent significance.

In the electric motor of the invention, the rotor cover is configured as plate-shaped and is comprised of a plate base and an annular wall on which the exhaust ports are preferably evenly distributed. The rotor cover configured in this way, with the exhaust ports positioned on the annular wall, intensifies the low pressure in the region of the bell floor, because the pressure produced by the main fan wheel is lowest in the circumferential region of the main fan wheel and therefore in the region of the exhaust ports. Furthermore, in this kind of embodiment, the exhaust ports are located on the maximum radius of the rotor cover. This increases the centrifugal force acting on the air between the rotor cover and the bell floor. In addition, because of the closed plate base of the rotor cover, direct axial entry of foreign particles is avoided. Moreover, the stronger centrifugal force also acts on the foreign particles that have penetrated and in that way improves a self-cleaning function of the air flow in the interior of the electric motor by expelling the foreign particles through the exhaust ports.

For further configuration of the invention, the rotor cover, on the inner surface of the plate base of the rotor cover that faces the rotor bell, has several radially extending interior blades that are fixedly attached to it, whereby two adjacent interior blades, together with the annular wall and the plate base of the rotor cover and the bell floor of the rotor bell, form a flow chamber, and each exhaust port in the annular wall is assigned to at least one flow chamber. This brings about an addition intensification of the air flow in the interior of the motor, because the rotational movement in the air in the flow chambers, and thus the centrifugal force acting on the air, is intensified by the internal blades, which also has an intensifying effect on the air flow in the interior of the motor.

It is preferred in one refinement of the invention that each aperture in the bell floor is assigned to at least one flow chamber. The low pressure in the flow chambers sucks the air through the apertures of the rotor bell and out of the interior of the motor.

The rotor cover is preferably manufactured of plastic.

The components cited above, as well as those covered by the claims, their inventive use being described in the examples of embodiments, are not subject to any exceptions concerning their size, form, configuration, choice of materials, or technical conceptions, so that the selection criteria known in their area of application can be applied without exception.

Figure 2:
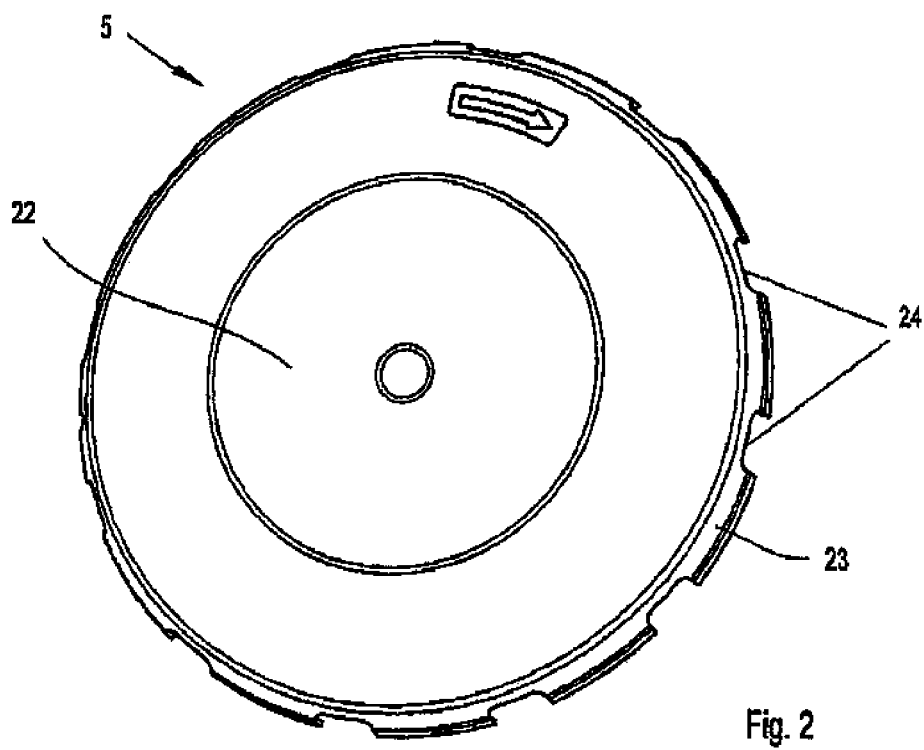
Figure 3:
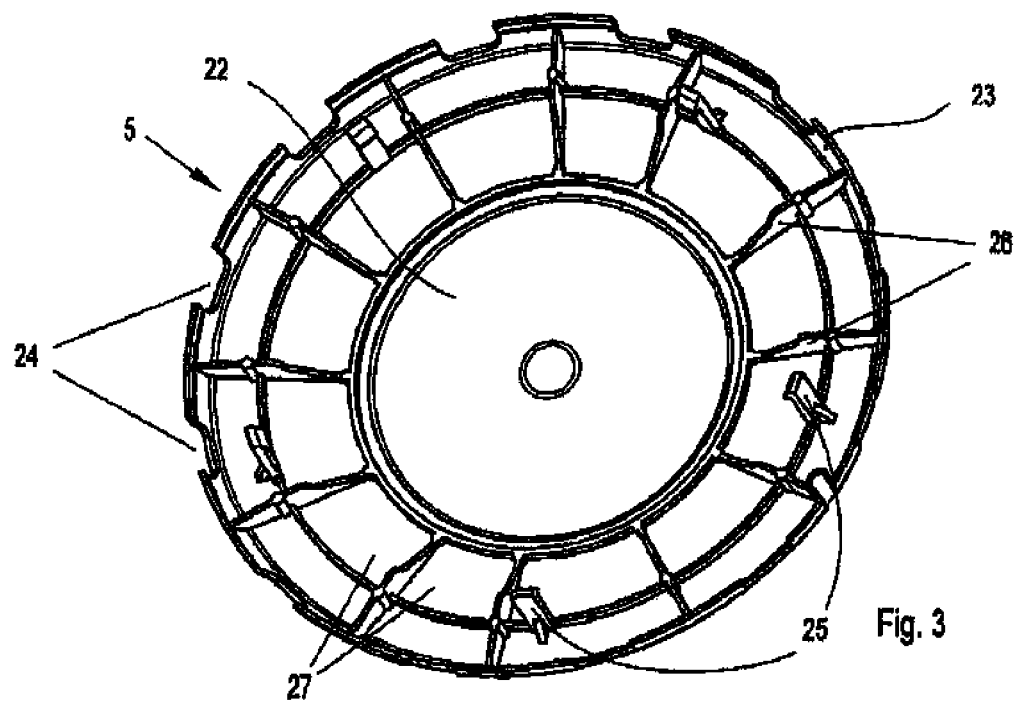
Figure 4:
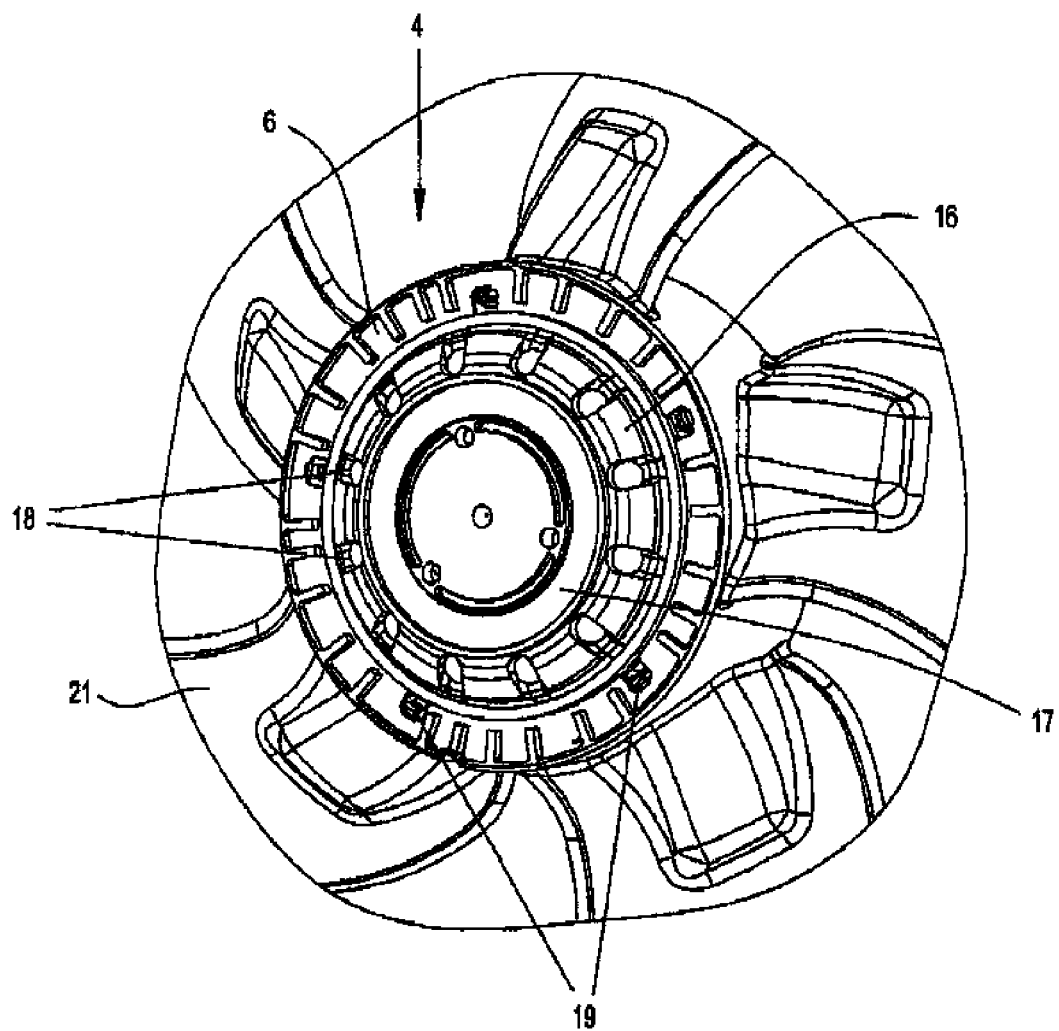

Additional details, characteristics, and advantageous additional embodiments of the invention become apparent in the embodiment described below and represented in the drawings, as well as in the dependent claims, wherein:

FIG. 1 is a sectional view of an electric motor of the invention,

FIG. 2 is a three-dimensional representation of an exterior view of a rotor cover in accordance with the invention of the electric motor of the invention according to FIG. 2, FIG. 3 is a three-dimensional representation of an interior view of a rotor cover in accordance with the invention of the electric motor of the invention according to FIG. 1, FIG. 4 is a three-dimensional representation of an exterior view of a rotor of the invention with a main fan wheel of the electric motor of the invention according to FIG. 1.

In the embodiment according to FIG. 1, an electric motor 1 is shown with a stator 2 affixed to a cooling flange 10 and an external rotor 3 comprised of a rotor bell 4 and rotor cover 5 that acts as a fan wheel. The rotor cover has a bell floor 6 that has a rotor hub 7 on its inner surface, in the middle, inside which rotor hub a motor shaft 8 is affixed, which is rotatably mounted inside the stator 2 on ball bearings 9. The stator is comprised chiefly of a wound stator sheet pack 13 with a stator flange 11 that is affixed to a cooling flange 10 and a conductor plate that is not shown. In the middle, the stator flange 11 forms a bearing support tube 14 for receiving the ball bearing 9. The stator sheet pack 13 is provided with an internal opening and is affixed to the bearing support tube 14. Between the cooling flange 10 and the front side of the rotor bell 4, there is an air gap 15 that allows an inflow of air into the interior of the electric motor 1.

In FIG. 4, an embodiment of the rotor bell 4 is represented in which the bell floor 6 merges with a conically tapering ring region 16 in a circular end face with a depression 17 to which the rotor hub connects in the center of the floor. In the conical ring region 16, several apertures 18 lie at the end of the depression 17, which are preferably evenly distributed over the ring region 16. Furthermore, the bell floor 6 has several receiving openings 19, which serve to anchor the rotor cover 5. A fan wheel 21 is affixed to the outer circumference of the rotor bell.

The rotor cover 5 shown in FIG. 2 and FIG. 3 is configured as a plate and is comprised of a completely closed plate base 22 and an annular wall 23 that preferably has exhaust ports 24 distributed evenly in the annular wall 23. On the inner side of the plate base 22 that faces the rotor bell 4, it has several detent arms 25 that engage into the receiving openings 19 of the bell floor 6 and firmly connect the rotor cover 5 to the rotor bell 4. Furthermore, on the inner side of the plate base 22 of the rotor cover 5 facing the rotor bell 4, there are several radially extending inner blades 26 that are fixedly connected to it, whereby the height of the interior blades 26 of the rotor cover 5 is adjusted to the outer contours of the bell floor 6 of the rotor bell. Two adjacent interior blades 26, together with the annular wall 23 and the plate base 22 of the rotor cover 5 and the bell floor 6 of the rotor bell 4, form a flow chamber 27. The exhaust ports 24 in the annular wall 23 are assigned to the flow chambers 27, and each aperture 18 in the bell floor 6 can be assigned to one or more flow chambers 27, whereby in the latter instance, the interior blade 26 is arranged above the aperture 18. In other embodiments, the interior blade 26 can also run centrally relative to the exhaust port 24 and be assigned to several flow chambers 27, or several apertures 18 in the bell floor 6 could be assigned to one flow chamber 27. The radius of the outer circumference of the plate base 22 of the rotor cover 5 corresponds to the radius of the outer circumference of the bell floor 6 of the rotor bell 4, so that the outer peripheral surface of the rotor cover 5 and the rotor bell 4 merge smoothly into each other.

The rotor bell and the rotor cover are preferably manufactured of plastic.

The embodiment of the electric motor described above results in highly efficient air-flow throughput within the electric motor and protects the interior of the electric motor from foreign particles that could have a negative effect on the performance and lifetime of the components of the electric motor.

The invention is not limited to the examples of embodiments shown and described.

The invention claimed is:

1. An electric motor with a stator and an external rotor, comprised of a rotor bell and a rotor cover acting as a fan wheel, the rotor bell having a bell floor with a first circumference defined by a first radius, and with a plurality of apertures in the bell floor, and the rotor cover having a plurality of exhaust ports, wherein the rotor cover is plate-shaped and has a plate base and an annular wall, the plate base having a second circumference defined by a second radius substantially equal to the first radius, wherein the exhaust ports in the annular wall are evenly distributed and positioned on the annular wall in an area of lowest air pressure during operation of the electric motor, wherein the plate base of the rotor cover is substantially closed and an inner surface of the plate base of the rotor cover facing the rotor bell has a plurality of radially extending interior blades that are fixedly connected to the plate base, wherein two adjacent of the interior blades, together with the annular wall and the plate base of the rotor cover and the bell floor of the rotor bell form a flow chamber, and each exhaust port in the annular wall is assigned to at least one flow chamber.

2. An electric motor according to claim 1, wherein each aperture in the bell floor is assigned to at least one flow chamber.

3. An electric motor according to claim 1, wherein the bell floor of the rotor bell has an annular region with apertures that are preferably evenly distributed over the circumference.

4. An electric motor according to claim 1, wherein the height of the interior blades of the rotor cover is adjusted to the outer contours of the bell floor of the rotor bell.

5. An electric motor according to claim 1, wherein the inner surface of the plate base of the rotor cover that faces the rotor bell has several detent arms.

6. An electric motor according to claim 1, wherein the bell floor of the rotor bell has several receiving openings.

7. An electric motor according to claim 1, wherein the rotor cover is integrally molded from plastic.

8. A rotor cover for use with an electric motor-according claim 1.

* * * * *

UNITED STATES PATENT AND TRADEMARK OFFICE
CERTIFICATE OF CORRECTION

PATENT NO. : 8,217,540 B2  Page 1 of 1
APPLICATION NO. : 12/694868
DATED : July 10, 2012
INVENTOR(S) : Best et al.

It is certified that error appears in the above-identified patent and that said Letters Patent is hereby corrected as shown below:

Col. 4, in claim 8, line 39, after "according" insert --to--.

Signed and Sealed this
Sixth Day of November, 2012

David J. Kappos
*Director of the United States Patent and Trademark Office*